Figure 1:
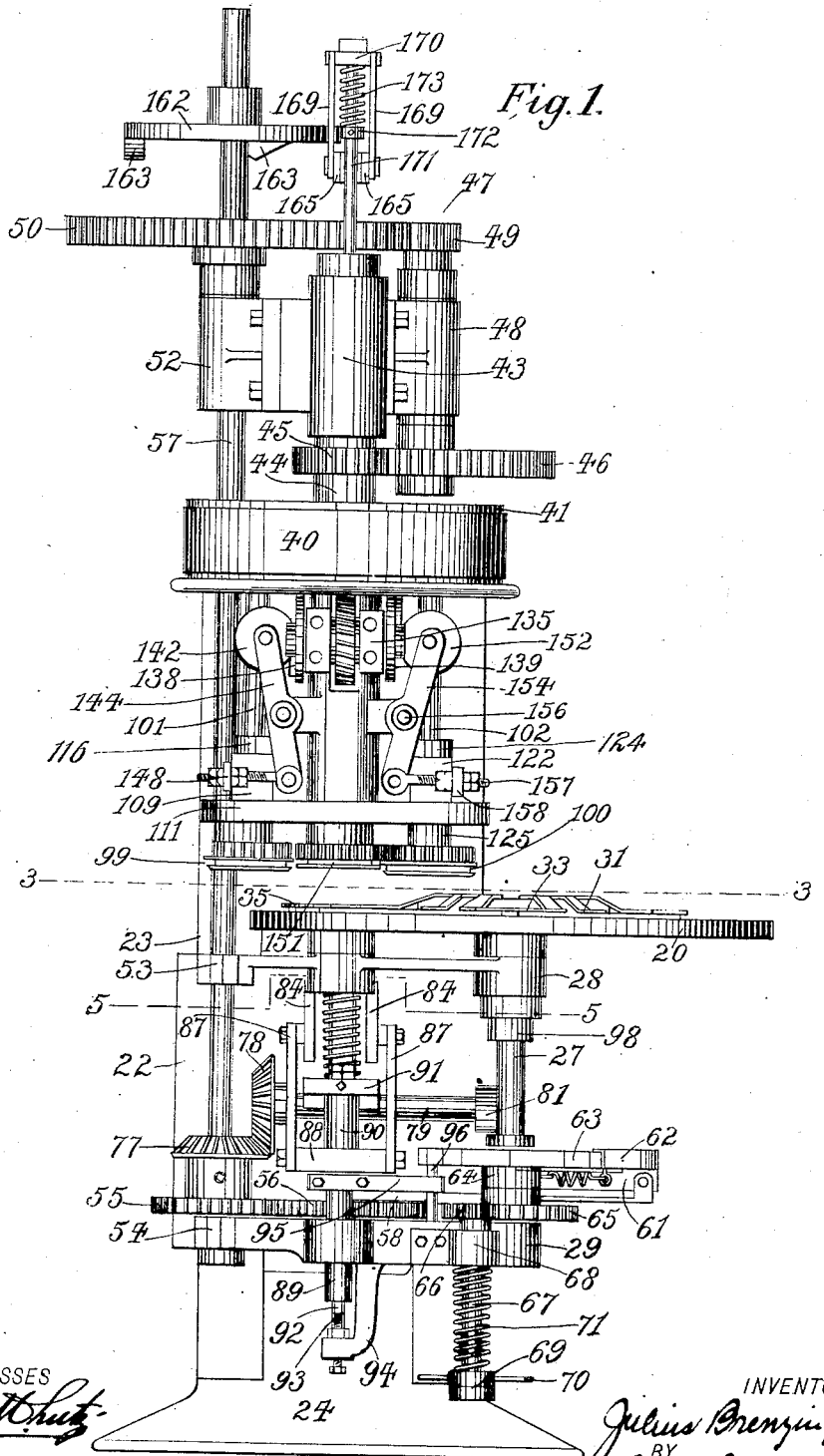

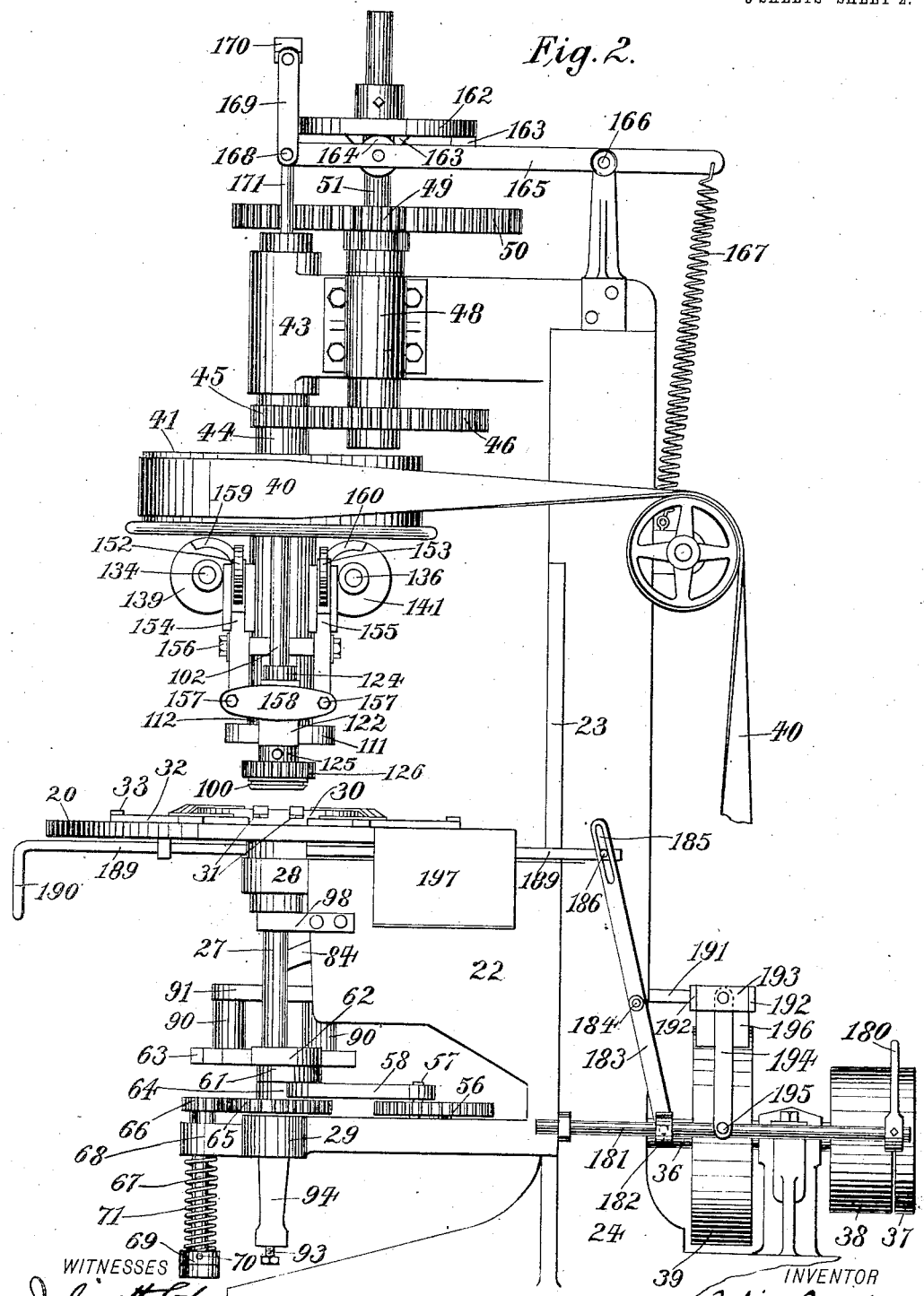

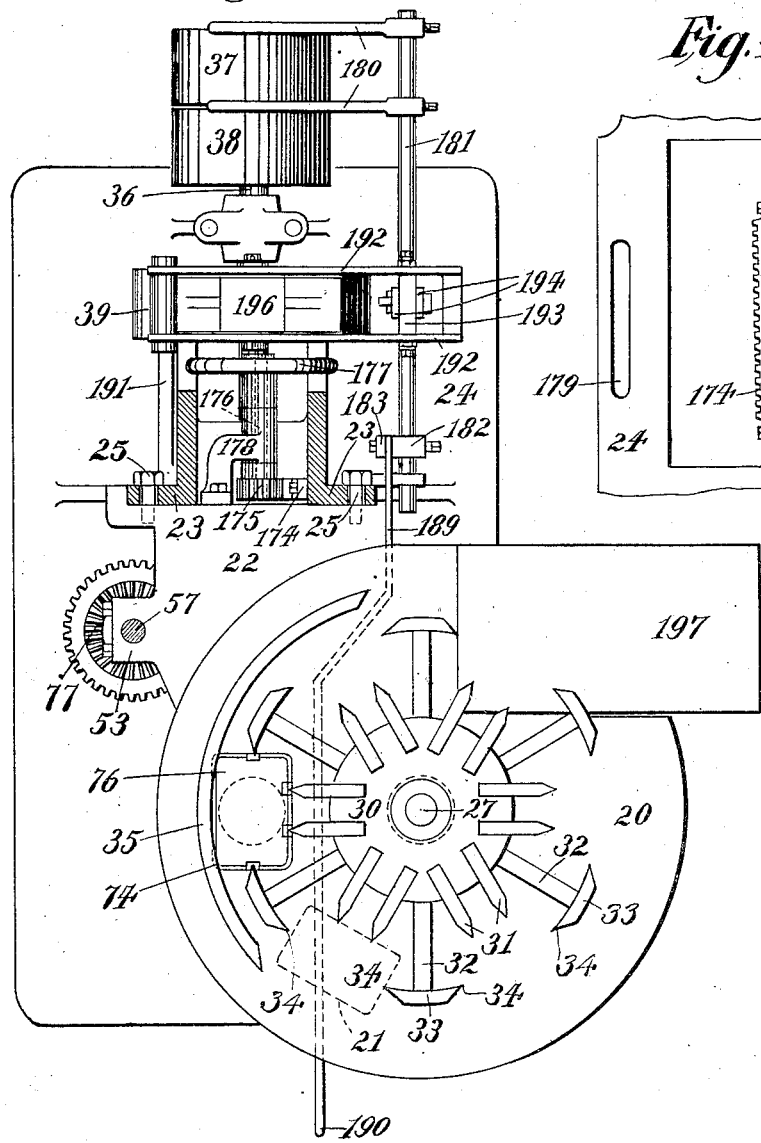

J. BRENZINGER.
CAN HEADING MACHINE.
APPLICATION FILED FEB. 20, 1907.
941,755.
Patented Nov. 30, 1909.
5 SHEETS—SHEET 4.
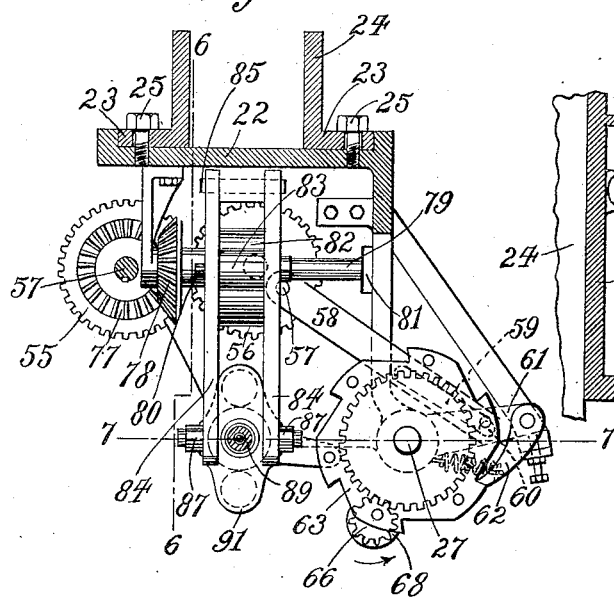
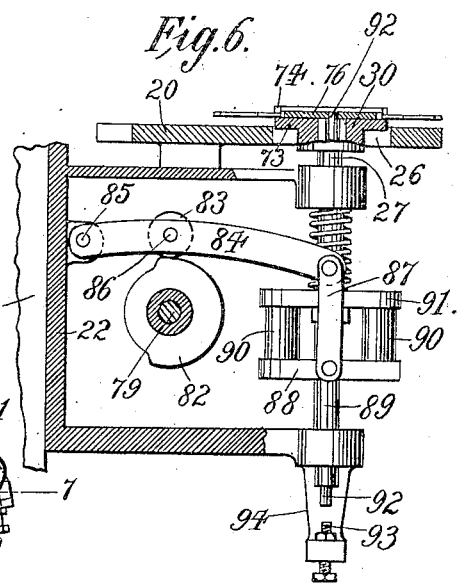
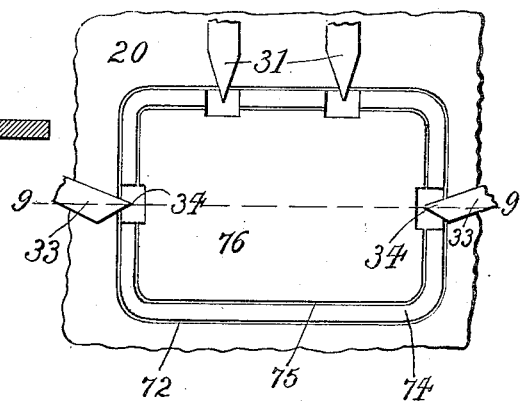
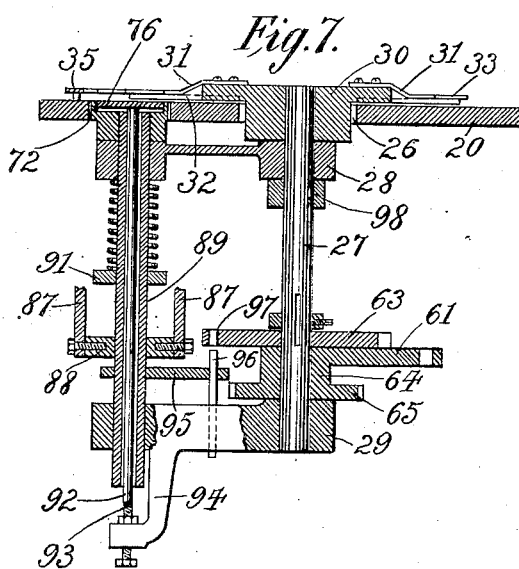
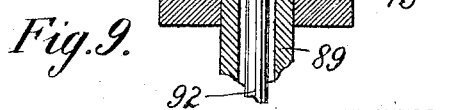
WITNESSES
INVENTOR
Julius Brenzinger
BY
ATTORNEY J. BRENZINGER.
CAN HEADING MACHINE.
APPLICATION FILED FEB. 20, 1907.
941,755.
Patented Nov. 30, 1909.
5 SHEETS—SHEET 5.
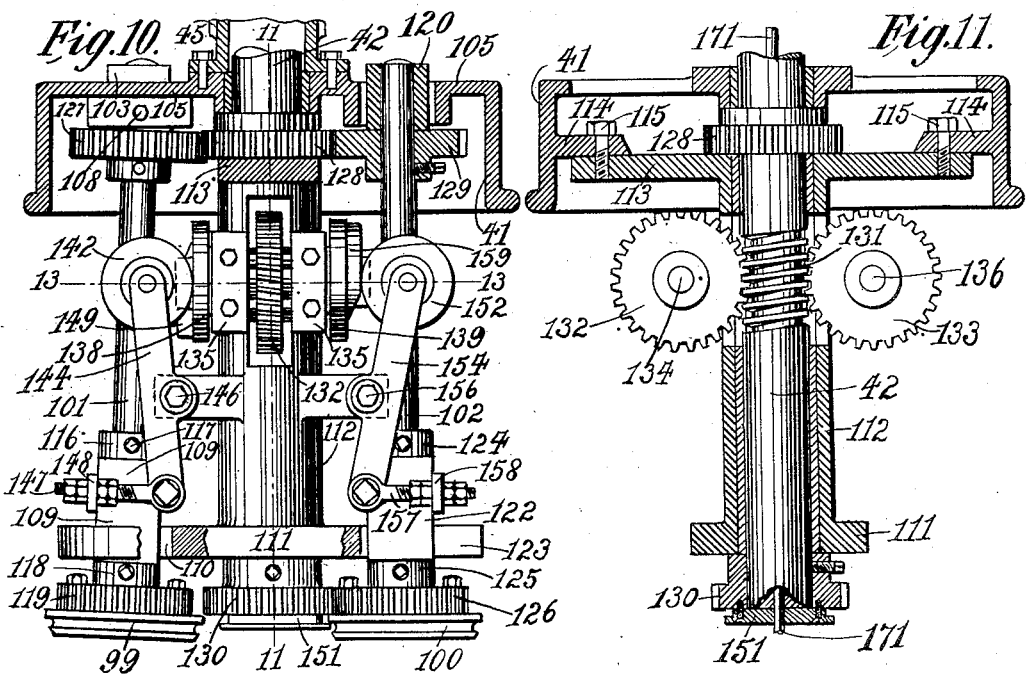
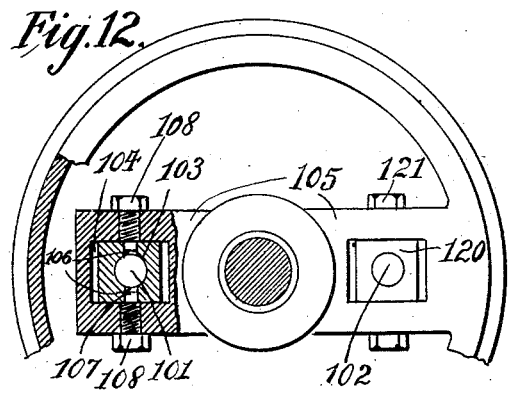
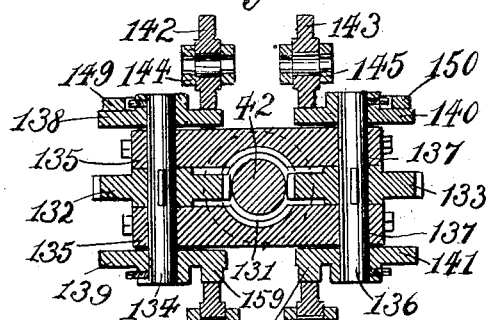
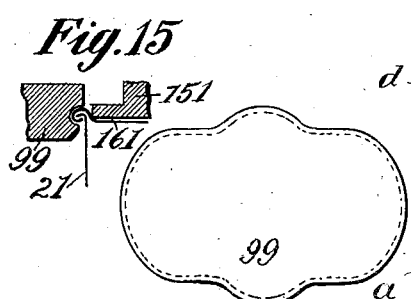
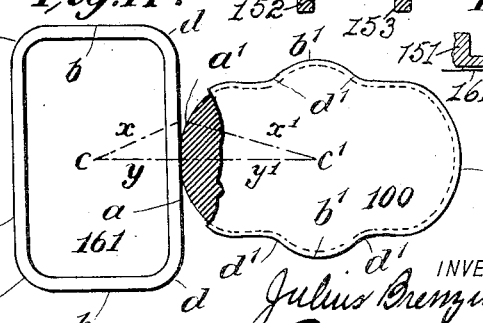
WITNESSES
Juliet H. Hutz
Frank Levy
INVENTOR
Julius Brenzinger
BY
Theo. H. Bouvrsock
ATTORNEY

UNITED STATES PATENT OFFICE.

JULIUS BRENZINGER, OF MOUNT VERNON, NEW YORK, ASSIGNOR TO SANITARY CAN MACHINERY COMPANY, OF ELLSWORTH, MAINE, A CORPORATION OF MAINE.

CAN-HEADING MACHINE.

941,755.      Specification of Letters Patent.      Patented Nov. 30, 1909.

Continuation of abandoned application Serial No. 330,528, filed August 14, 1906. This application filed February 20, 1907. Serial No. 358,344.

*To all whom it may concern:*

Be it known that I, JULIUS BRENZINGER, a citizen of the United States, residing at Mount Vernon, in the county of Westchester and State of New York, have invented certain new and useful Improvements in Can-Heading Machines, of which the following is a specification, this application being a continuation of my earlier application, Serial No. 330,528, filed August 14, 1906.

This invention relates to can-heading machines, with more particular reference to machines for seaming or double-seaming ends or heads to can-bodies of non-cylindrical configuration. I have more especially in mind in the present invention a machine which may not only be operated with great rapidity, but which, with this end in view, will automatically deliver the assembled unjoined parts to the seaming mechanism and eject the headed can therefrom. In machines of this class wherein a chuck—or support for the superposed edges to be seamed—is rotated in coöperative relation to a seaming-roller, it will be apparent that the chuck, at least, must have certain periods of rest, during which the seamed or headed can may be removed and another can-body and head properly placed and adjusted for the seaming operation. This intermittent rotation of the chuck gives rise to certain difficulties when one attempts to apply any sort of automatic feeding device intended to deliver the assembled can parts successively to the seaming mechanism. These difficulties, obviously, while not at all fatal to the proper operation of a machine of this class, certainly curtail the capacity of the machine, which is limited to the skill of the operator in removing the seamed can and supplying and adjusting the disjoined parts for the subsequent operation. Primarily for the purpose of increasing the output of a machine of this class, the present invention has in view a machine in which the can-supporting platform and chuck remain stationary during the seaming operation, the latter being effected by means of one or more seaming-rollers which have what may be termed a gyratory movement around the chuck in continuously coöperative relation thereto. In carrying out this idea, it will be apparent that the operation of heading what is known as a round or cylindrical can would be comparatively simple, inasmuch as the orbit of revolution of a circular seaming-roller would be purely circular, whereas with can-bodies of non-cylindical configuration, presenting non-circular edges to be seamed, the necessary gyratory orbit of a circular seaming-roller would have to be not only non-circular but no known form of simple curve. Therefore, where gyrating seaming rollers having substantially circular peripheries are employed, it will be apparent that such rollers must be mounted in radially-yielding bearings. In such event, it being obviously necessary that the advancing pressure of the roller against the chuck be continuous and uniform, very rapid operation of the machine will render it impossible to secure either uniformity or continuity, due to the fact that as the bearings of the roller radially yield to the obstructions in their normally circular path, caused by the deviations from the circular in the peripheral configuration of the chuck, inertia will overcome the mechanical force relied upon to return said bearings, thus failing to subject a succeeding portion of the combined edges to the effective coöperative action of roller and chuck.

The essence of the present invention, therefore, resides in means for revolving a seaming-roller around a stationary, non-circular chuck in a fixed or undeviating orbit and preserving continuous and substantially uniform coöperative relation between roller and chuck. Incidental to the above, the invention has further in view the provision of means for automatically delivering the unseamed parts to the machine and means for ejecting the completed can or container, and for interdependently timing various independent operations.

My invention will be more readily understood by reference to the accompanying drawings, forming a part of this specification, in which—

Figure 1 is a front elevation of a can-heading machine embodying my invention; Fig. 2 a side elevation thereof; Fig. 3 a horizontal section on the line 3—3 of Fig. 1; Fig. 4 a detail front view of the rack for vertically adjusting the can-supporting means; Fig. 5 a horizontal section on the line 5—5 of Fig. 1; Fig. 6 a vertical section on the line 6—6 of Fig. 5; Fig. 7 a similar section on the line 7—7 of Fig. 5, for purposes of clearness of illustration, certain part being omitted; Fig. 8 a detail plan view of the can-supporting disk; Fig. 9 a cross-section on the line 9—9 of Fig. 8; Fig. 10 a longitudinal section, partly in elevation, through the seaming mechanism; Fig. 11 a longitudinal section on the line 11—11 of Fig. 10; Fig. 12 a plan view thereof, partly in section and partly broken away; Fig. 13 a cross section on the line 13—13 of Fig. 10; Fig. 14 a plan view partly broken away, of the seaming rollers and can cover or head; Fig. 15 a detail section of a seaming roller and the chuck, showing their coöperative relation, and Fig. 16 a similar section through another seaming roller and the chuck.

For the purposes of illustration and description, I have shown in the accompanying drawings a machine adapted to head cans of what may be termed oblong or round-cornered rectangular configuration, and I shall proceed to describe my invention as applied to such machine, but it will be apparent that with slight modifications the machine may be adapted to seam can-bodies of other shapes.

Referring now to the drawings in detail, numeral 20 refers to a normally stationary table mounted upon a suitable bracket or support 22 which is flanged to engage rails 23 23 on the machine-frame 24 and vertically adjustable thereon by means of the clamping screw 25 25. This table 20 is centrally apertured at 26 for the reception of the hub of the feed-spider 30 mounted at the top of the shaft 27 which has bearings 28 and 29 carried by said support 22. This feed-spider 30 is provided with a plurality of pointed fingers 31 31, preferably arranged in pairs which alternate with arms 32, radially extending from said spider 30, which are longer than said fingers and are provided at their outer ends with heads 33 presenting the circumferential or laterally-extending points 34 34. The relative sizes, positions and adjustment of said fingers and arms are intended to be such that the points of the former are adapted to engage the long side of the can-body 21, while the points of the latter engage the opposite sides thereof, as shown in Fig. 3. A grooved peripheral guard 35, suitably mounted on the table 20, is adapted to coöperate with said fingers and arms to insure the proper presentation of the assembled separate parts of the complete can-body to the seaming mechanism.

The main driving-shaft 36 is suitably journaled in bearings in the frame 24 and preferably provided with fast and loose pulleys 37 and 38. Depending from an arm or bracket 43 of the frame 24 is the fixed vertical shaft 42, rotatably mounted upon which is the pulley 41 directly driven from the main power-shaft 36 by means of the belt 40. Journaled in bearings 48 in said arm 43 is the shaft 47 carrying a gear 46 which meshes with a pinion 45 on the hub 44 of the pulley 41. At the upper end of the shaft 47 is mounted a pinion 49 engaging a gear 50 on the counter-shaft 51. This counter-shaft 51 is journaled in upper bearings 52 on the frame 24, and in a pair of lower bearings 53 and 54 on the support 22. At the lower end of the shaft 51 is secured, preferably by a groove and feather connection, a gear 55 meshing with a gear 56 rotatably mounted on the support 22. To the gear 56 is pivoted at 57 one end of a link 58 the other end of which is provided with a slot 59 (see dotted lines in Fig. 5) into which slot projects a pin 60 on a lever 61 loosely mounted on the shaft 27. To the outer end of this lever 61 is pivoted a spring-pressed pawl 62 adapted to successively engage the teeth of a ratchet-wheel 63 on the shaft 27, the number of teeth corresponding to the number of spaces between the arms 32 32 of the feed-spider 30.

The hub 64 of the lever 61 carries, preferably integral therewith, a gear 65 meshing with a gear 66 on a spindle 67 which has bearings 68 on the support 22. To the lower end of this spindle 67 is secured a collar 69, preferably provided with projecting handles 70. Around the spindle 67 is coiled in suitable torsional tension a spring 71, the upper end of which is secured to the bearing 68, while its lower end is secured to the collar 69. The torsional tension of this spring is designed to provide a yielding force tending to rotate the pinion 66 in the direction of the arrow shown in Fig. 5.

By reference to Fig. 5 it will be seen that when the gear 56 is turned through one-half of a complete rotation, starting from the position indicated, the link 58 will operate through the pin 60, at the outer edge of the slot 59 in said link, to rotate the lever 61 and therewith the pawl 62 until the latter has reached and engages the next succeeding tooth of the ratchet-wheel 63. It will be remembered that this lever 61 is connected or integral with the gear 65, and, therefore, rotation of said lever will effect rotation of the spindle 67 against the torsional action of the spring 71 to store energy in the latter, whereby, upon continued rotation of the gear 56, the lever 61, under the influence of said spring 71, will advance the pawl 62 and therewith the ratchet-wheel 63 through one step. This ratchet-wheel 63 being fixed upon the shaft 27, to the upper end of which shaft is fixed the feed-spider 30, and the teeth of said ratchet-wheel being spaced to correspond with the spaces between the arms 32 of said spider, it will be apparent that in the manner described the feed-spider 30 will be intermittently advanced and a new can-body with an unseamed head thereon presented to the seaming mechanism at each complete rotation of the shaft 51. The feed-spider 30 being thus driven under action of a yielding force, provided by the spring 71, and not positively, it will be seen that there could be no serious damage to or breakage of the machine or parts thereof in case the feed-spider should become clogged or arrested by an improperly fed or adjusted can-body, or through any other accident. In such case, the pawl 62 is retracted in the manner described to engage the next succeeding tooth in the ratchet-wheel 63, but, the driving force being yielding, said ratchet-wheel will remain stationary, the slot 59 permitting the link 58 to run idly until the obstructing can or other body has been removed by the operator.

The table 20 is provided with an opening 72 located immediately below the seaming mechanism and of a configuration to receive a correspondingly-shaped plunger 73 which is provided with a recess 75 leaving a circumferential rim 74. This recess 75 is of a shape and size to correspond with the shape and size of the can to be closed, so that the lower part of the can may be received within such recess and lateral movement or displacement thereof prevented by the rim 74.

I have shown a bevel-gear 77, mounted on the hub of the gear 55, meshing with similar gear 78 of the same diameter on the end of the horizontal shaft 79 which has bearings 80 and 81 on the support 22. This shaft 79 is provided with a cam 82 adapted to act against a roller 83 carried by a lever which is composed of the two parallel arms 84 84 pivoted at 85 on the support 22, (see Figs. 5 and 6). These arms 84 84 are preferably connected by a transverse rod or brace 86 upon which the roller 83 is rotatably mounted. The free ends of the arms 84 84 are connected by links 87 to a collar 88 on the hollow spindle 89 to the upper end of which the plunger 73 is secured. Loose upon said spindle 89 is the spring-pressed collar 91 while between the fixed and loose collars 91 and 88 are interposed suitable yielding cushions 90 90. From the above it will be seen that rotation of the shaft 79 will through the cam 82 raise the arms 84 84 and elevate the plunger 73 under a yielding force. When the roller 83 reaches the reduced portion of the cam 82, said plunger is returned to its normal position under action of the spring-pressed collar 91.

The hollow spindle 89 contains a stem 92, upon the upper end of which is mounted the support or platform 76. The lower end of the stem 92 projects slightly below the lower end of said hollow spindle 89 and is adapted to rest upon an adjusting screw 93 tapped into the bracket 94 of the support 22. The upper face of the platform 76 is intended to be normally flush with both the edge of the rim 74 and the upper face of the table 20—this, in order that the cans may readily slide from the latter over the rim 74 and thence upon the platform 76, or from said platform back upon the table. With this end in view, the screw 93 is so adjusted that when the plunger 73 is in its lowermost position (that is, when the rim 74 is flush with the table 20), the stem 92, resting upon the screw 93, supports the platform 76 in such a relative position that its upper face is also flush with the upper face of the table 20. With these parts in this position of adjustment, obviously, a can-body will easily slide from the table over the rim of the plunger and upon the platform. The plunger will then start upon its upward movement and its rim 74 will be raised to embrace the can, which, however, is not raised until the plunger 73 has moved through sufficient distance that the bottom of the recess 75 reaches the lower side of the platform 76, when said platform is raised and therewith the can 21.

It will be apparent that during the operation of the plunger and the immediately-following operation of the seaming mechanism—during which operations the pawl 62 recedes from one to the next succeeding tooth in the ratchet-wheel—the feed-spider 30 should be positively locked against movement. For this purpose the spindle 89 is provided with an arm 95 carrying at its free end a bolt or locking pin 96. When the spindle 89 is raised, the bolt or locking pin 96 will be raised therewith to enter one of a series of circularly-arranged, equidistant apertures 97 in the ratchet-wheel 63, so that said ratchet-wheel and, therefore, the spider 30 will be locked against rotation. In order to more promptly arrest the feed-spider and prevent its rotation by inertia after the pawl 62 has completed its forward stroke, I prefer to provide a brake-strap 98 secured to the support 22 and embracing the shaft 27.

The stationary vertical shaft 42 carries at its lower extremity the chuck 151, which is of a peripheral configuration corresponding to the cross-sectional configuration of the can-body and is adapted to fit within a correspondingly-shaped recess in the head of the can to laterally support the edges thereof during the seaming operation. As hereinbefore suggested, this chuck 151 is located immediately above the plunger 73, the adjustment being such that when the can-body, with the head or end portions loosely placed thereon, is raised by said plunger, the chuck 151 is forced into the recess in said can-head and the parts are firmly gripped between and supported by said plunger and said chuck. As is well known, the end of the can-body has been previously flanged, the edge of the can-head, when adjusted for the seaming operation, overlying said flange and these superposed layers being laterally supported by the chuck. The process of double-seaming such superposed edges by seaming-rollers, as a general proposition, is well known and understood. It being the essence of this invention to preserve a continuously uniform coöperative relation between a non-circular chuck and a seaming-roller revolving around said chuck in a positively fixed path and in continuously coöperative relation thereto, it will be apparent that the peripheral configuration of the roller should be substantially complemental to the peripheral configuration of the chuck; that is to say, the seaming roller should have a peripheral configuration presenting alternately outwardly and inwardly extending curved portions complemental to the deviations from the circular of the chuck, whereby when said roller revolves around said chuck in a fixed orbit, a continuously and uniform coöperative relation is insured. With simplicity of construction and operation in view, I prefer that the orbit of the gyrating seaming-roller be circular and the periphery thereof be of substantially the same length as the working periphery of the chuck. In such cases a purely rolling contact is preserved between roller and chuck during each revolution, the seaming-roller making one rotation on its own axis for each complete revolution around the chuck. With a roller having a peripheral configuration complemental to the peripheral configuration of the chuck, thus insuring continuously uniform coöperative relation between these two parts, it will be apparent that no great difficulties are encountered in insuring a fixed circular orbit of revolution of said roller and a positively-controlled single rotation thereof during such revolution.

Assuming that what is generally known as a "square" can—or, more properly, a can having a substantially rectangular cross-sectional configuration, with rounded corners—is to be headed, the proper peripheral configuration of the seaming-rollers is indicated in Fig. 14. It is possible, of course, that one roller might suffice to satisfactorily effect the seaming operation, but I prefer to employ two, as shown, operating successively, the roller 99 being adapted to first properly interfold the overlying layers, as illustrated in Fig. 15, and the roller 100 subsequently compressing the interfolded layers into a bead or a seam, as suggested in Fig. 16. For this purpose, each of these rollers is provided with an annular peripheral groove, the groove in the roller 100 being preferably somewhat shallower and wider than the groove in the roller 99. With the exception of the cross-sectional configuration of this groove, the rollers 99 and 100 are substantially identical in configuration and operation, and, therefore, a detailed description of one will suffice for both. Referring, then, to the roller 100, as best shown in Fig. 14, it will be apparent that if the orbit of revolution of said roller is circular, the distance from the center $c$ of the can-cover 161 to the center $c'$ of the roller 100 will be the radius of said orbit and will remain constant. To insure a continuous coöperative relation, therefore, said roller must be elongated, having enlarged cam-sections $a'$ suitably curved and of a length to correspond with the length of the longer side edge $a$ of the can cover or head, similar cam-sections $b'$ suitably curved and of a length to correspond with the shorter side edges $b$ of said cover or head. In other words, the working periphery of the roller 100 is of substantially the same length as the working periphery of the chuck 151, the radii of chuck and roller brought into successive alinement, as the latter rolls around the former, being each complemental to the other in that the sum thereof is at all times equal to the orbital radius. Thus, the sum of the radii $x$ and $x'$ is equal to the sum of the radii $y$ and $y'$, or to the sum of any other two radii which come into alinement as said roller revolves around the chuck.

As hereinbefore suggested, it is intended that the rollers 99 and 100, if two are employed, be brought successively into operative relation to the chuck 151. To effect this result, and at the same time insure both positively actuated revolution and positively actuated rotation of the rollers, I have shown the roller 99 mounted upon a shaft 101 which is journaled in upper bearings 103 mounted within a slot 104 of a cross-web 105 of the pulley 41. This bearing 103 is provided with sockets 106 which receive the pins 107 of a pair of screws 108. Near its lower end, the shaft 101 is journaled in a squared bearing 109 slidable in a slot 110 of a collar 111 fixed upon or integral with the tubular hub or sleeve 112 of a cross-bar 113 secured to the lugs 114 in the interior of the pulley 41 by screws 115. The shaft 101 is held against relative axial displacement by a collar 116, clamped to said shaft by screws 117, and by the hub 118 of the gear 119 to the lower face of which said roller 99 is secured. In a like manner, the shaft 102, carrying the roller 100, is journaled in upper bearings 120 pivoted at 121 to the cross-web 105 of the pulley 41. The lower end of the shaft 102 is journaled in bearings 122 which are similarly slidable in the slot 123 of the collar 111. The shaft 102 is similarly held against relative axial displacement by means of a collar 124 and the hub 125 of the gear 126 to which the roller 100 is secured.

Near the upper end of the shaft 101 is mounted a gear 127 in permanent intermeshing relation to a gear 128 of the same diameter mounted upon the stationary shaft 42. Similarly, a gear 129 at the upper end of the shaft 102 is in permanent intermeshing relation with said gear 128. It will be seen, therefore, that when the pulley 41 has made one complete rotation, the shafts 101 and 102 will each have made one complete revolution around the shaft 42 and also one complete rotation on its axis, and, consequently, the gears 127, 128 and 129 being of the same diameter, the seaming-rollers 99 and 100 will each have rolled once around the chuck 151.

The shaft 42 is provided with a worm 131 in permanent intermeshing relation to each of a pair of gears 132 and 133 arranged on diametrically opposite sides of said shaft, the gear 132 being mounted upon a shaft 134 which is journaled in bearings 135 on the sleeve 112, while the gear 133 is mounted on a shaft 136 in bearings 137 on said sleeve. On the ends of the shaft 134 are mounted the cam-disks 138 and 139, while the shaft 136 carries at its ends in a similar manner the cam-disks 140 and 141. The cam-disks 138 and 140 are so located as to be in operative relation to a pair of rollers 142 and 143 at the upper extremities of the levers 144 and 145, respectively, said levers being fulcrumed to lugs projecting from the sleeve 112, as at 146. To the lower end of each of these levers 144 and 145 is pivoted an arm 147, which has an adjustable and, therefore, preferably screw-threaded connection with the plate 148 secured to the bearing 109. It will be apparent that as the cam-disks 138 and 140 are jointly rotated, the raised sections 149 and 150 of said cams will, during a part of such rotation, act against the rollers 142 and 143, respectively, and force outwardly the upper ends of the levers 144 and 145. The lower ends of these levers will, obviously, be forced inwardly and, through the arms 147, force inwardly therewith the lower end of the shaft 101. Such movement of the shaft 101 will bring the gear 119 into intermeshing relation with the gear 130 on the lower end of the shaft 42, and the roller 99 into coöperative relation with the chuck 151. In a similar manner the raised sections 159 and 160 of the cam-disks 139 and 141 are adapted to act against a pair of rollers 152 and 153, respectively, at the ends of similar levers 154 and 155 fulcrumed to lugs projecting from the sleeve 112, as at 156. To the lower end of each of these levers 154 and 155 is similarly pivoted an arm 157 which adjustably engages the plate 158 secured to the bearing 122. As the cams 139 and 141 are rotated, therefore, the upper ends of the levers 154 and 155, through the rollers 152 and 153, will be pressed outwardly so that in a similar manner the lower end of the shaft 102 is forced inwardly, the gear 126 into intermeshing relation with the gear 130 and the seaming roller 100 into coöperative relation with the chuck 151. These cams are so arranged that the lower ends of the shafts 101 and 102 are alternately swung inwardly to effect the successive operation of the rollers hereinbefore referred to.

It will be apparent that it is desirable that there should be provided two sets of intermeshing gears 127, 129, 128 and 119, 126, 130. The upper set, 127, 129 and 128, being in permanent intermeshing relation, serves to insure proper positional relation between the chuck 151 and the seaming rollers 99 and 100 at all times. Inasmuch as the gears 127 and 129 are mounted on shafts which have a slight oscillating movement, it will be apparent that there must be some play between the teeth on these gears. During the operation of either one of the seaming rollers, the corresponding lower gear is in intermeshing relation to the gear 130 to more effectually insure a proper rolling contact between chuck and roller and completely eliminate relative sliding movement between the working edges.

Particularly where a machine embodying my invention is employed for the purpose of heading cans which have been filled with the material or product that they are adapted to contain, it will be apparent, inasmuch as such contents in their natural state are often of too great bulk to lie wholly within the confines of the container, that some preliminary pressure is necessary in order to force the unseamed head or cover down against the can-body and hold the same firmly thereagainst during the seaming operation. To provide this pressure, and hold the can-head or cover 161 against displacement prior to and during the seaming operation, I mount upon the shaft 51 a disk 162 provided with a pair of downwardly projecting cams 163, each adapted to engage a roller 164 rotatably carried between a pair of levers 165 fulcrumed to the frame 24 at 166. A spring 167, in tension between the other end of this double lever 165 and a suitable point on said frame 24, serves to keep the front end of said lever in its most elevated position and said roller 164 in contact with said disk 162. To the front ends of this double lever 165 are pivoted at 168 a pair of links 169 which are connected at their upper ends by an apertured cross-bar 170. To this cross-bar 170 is slidably secured the upper end of a rod 171 which passes downwardly through a corresponding bore in the shaft 42 and through a suitable aperture in the chuck 151. Near its upper end the rod 171 is provided with a fixed collar 172, between which and said cross-bar 170 a suitable spring 173 is in compression. It will be seen that when one of the cams 163 comes into contact with the roller 164, the front end of the double lever 165 will be depressed and carry therewith the rod 171 to project the lower end thereof a suitable distance below the lower face of the chuck 151, as best shown in Fig. 11. When said cam has passed said roller, the lever 165 will, under the action of the spring 167, be returned to its former or normal position, raising therewith the rod 171. The cams 163 are so located on the disk 162 as to twice depress the rod 171 and properly time such depression so that, first, after an unseamed can has been conveyed to the platform 76, said rod 171 is depressed to properly seat the head or cover on the flanged can-body. During the following elevation of the can-body and head into operative engagement with the supporting and seaming mechanism, the rod 171 will remain in engagement with the cover of the can and will be raised therewith against the action of the spring 173. Secondly, after the seaming operation has been completed, the rod 171 is again depressed by the second cam 163 to positively release the seamed can from the chuck 151.

The support 22 of the table 20 is vertically adjustable, as hereinafter stated, to adapt the machine to cans of different heights. To facilitate this adjustment I prefer to secure to the frame 24 a rack 174 which is engaged by a pinion 175 fixed upon the shaft 176, journaled in bearings 178 on the support 22 and provided with a band wheel 177. As suggested, the support 22 may be locked in position, after adjustment, by means of the clamp-screws 25 passing through slots 179 in the frame 24 and tapped into said support 22.

Operation of the machine is controlled by shifting the belt that operates the power-shaft 36 either to the fast pulley 37 or the loose pulley 38. This is effected in the usual manner by a belt-shifter 180 secured to the reciprocating rod 181. To a fixed collar 182 on the rod 181 is pivoted one end of a lever 183 fulcrumed to the frame 24 at 184. The other end of the lever 183 is provided with a slot 185 into which projects a pin 186 on the rod 189, which is preferably provided with an accessible handle 190. When, through this handle, the rod is pulled forward, the lever 183 will shift the driving belt to the fast pulley 37, while when the rod is pushed backward the belt is shifted from the fast pulley 37 to the loose pulley 38.

To the post 191 on the frame 24 are pivoted a pair of levers 192 connected at their free ends by a cross-piece 193. To the latter are pivoted a pair of links 194 which are, in turn, pivoted to the rod 181 at 195. Between the levers 192 and above the pulley 39, there is pivoted a brake-shoe 196 adapted to engage said pulley. These parts are so arranged that when the driving belt is shifted to the fast pulley 37, the links 194 assume a substantially vertical position and the brake-shoe 196 is lifted off said pulley 39. If, however, the driving belt is shifted to the loose pulley 38, the links 194 are inclined to draw the shoe 196 against the pulley 39 and promptly arrest movement of the machine.

For the successive seaming of a large number of can-bodies, it is desirable that the pulley 41 be continuously rotated. The can-bodies, each with an unseamed superposed head thereon, are successively placed upon the table 20, each being properly adjusted between the arms of the feed-spider 30. As this feed-spider is intermittently rotated, the can-body will be carried along within the guard 35 until it arrives in proper position above the plunger 73, whereupon the latter will be raised, together with the platform 76, to bring the can into positively supporting engagement with the chuck 151. The seaming rollers, which are continuously revolving, are, in the manner hereinbefore explained, successively brought into coöperative relation with said chuck to first properly interfold the superposed edges and then compress the same into a bead. After the seaming operation has been completed, the plunger 73 is lowered and the headed can is forcibly stripped from the chuck 151 through the action of the rod 171, as explained. The headed can will then be conveyed by the spider 30 from the plunger 73 back upon the imperforate portion of the table 20 and along the latter toward a delivery-chute 197.

Many modifications of minor details of my improved can-heading machine will undoubtedly readily suggest themselves to those skilled in the art to which it appertains, and I therefore do not desire to limit my invention to the specific construction herein shown and described.

Having thus described my invention, I claim as new and desire to secure by Letters Patent:

1. In a can-heading machine, the combination, with a non-circular chuck, of a seaming roller, and means for revolving said seaming roller in a circular orbit around and in continuous coöperative relation to said chuck.

2. In a can-heading machine, the combination, with a stationary non-circular chuck, of a seaming roller, and means for revolving said seaming roller in a circular orbit around and in continuously uniform coöperative relation to said chuck.

3. In a can-heading machine, the combination, with a stationary non-circular chuck, of a non-circular seaming-roller, and means for revolving said seaming-roller around said chuck in continuous coöperative relation thereto.

4. In a can-heading machine, the combination, with a stationary non-circular chuck, of a complementally non-circular seaming-roller, and means for revolving said seaming-roller around said chuck in continuous coöperative relation thereto.

5. In a can-heading machine, the combination, with a stationary non-circular chuck, of a non-circular seaming-roller, and means for revolving said seaming-roller around said chuck in continuously uniform coöperative relation thereto.

6. In a can-heading machine, the combination, with a stationary non-circular chuck, of a non-circular seaming-roller of equal peripheral length, and means for revolving said seaming-roller around said chuck in continuous coöperative relation thereto.

7. In a can-heading machine, the combination, with a stationary non-circular chuck, of a complementally non-circular seaming-roller of equal peripheral length, and means for revolving said seaming-roller around said chuck in a circular orbit.

8. In a can-heading machine, the combination, with a stationary non-circular chuck, of a seaming-roller in continuously coöperative relation thereto, and means for positively both revolving and rotating said roller.

9. In a can-heading machine, the combination, with a stationary non-circular chuck, of a seaming-roller, means for revolving said roller around said chuck, and means for insuring rolling coöperation only between roller and chuck.

10. In a can-heading machine, the combination, with a stationary non-circular chuck, of a seaming-roller, means for revolving said roller around said chuck, and means for insuring continuously uniform rolling coöperation only between roller and chuck.

11. In a can-heading machine, the combination with a stationary non-circular chuck, of a complementally non-circular seaming-roller, and means for positively both revolving said roller in a fixed orbit around said chuck and rotating said roller about its axis.

12. In a can-heading machine, the combination, with a stationary non-circular chuck, of a complementally non-circular seaming-roller of equal peripheral length, and means for positively both revolving said roller around said chuck and rotating said roller once on its axis for each complete revolution thereof.

13. In a can-heading machine, the combination with a stationary non-circular chuck, of a complementally non-circular seaming-roller, means for positively both revolving said roller in a fixed orbit around said chuck and rotating said roller about its axis, and means for insuring a continuous coöperative relation between roller and chuck.

14. In a can-heading machine, the combination, with a stationary non-circular chuck, of a complementally non-circular seaming-roller of equal peripheral length, and means for positively both revolving said roller around said chuck and rotating said roller once on its axis for each complete revolution thereof, the orbit of revolution being invariably circular whereby coöperative action is continuous and uniform.

15. In a can-heading machine, the combination, with a non-circular chuck, of a pair of seaming rollers, and means for revolving said rollers around said chuck in alternately effective coöperative relation thereto, the orbit of revolution of each roller being fixed during the period of coöperative operation.

16. In a can-heading machine, the combination, with a stationary non-circular chuck, of a pair of seaming rollers, and means for revolving said rollers around said chuck in alternatively effective coöperative relation thereto, the orbit of revolution of each roller being circular during coöperative operation.

17. In a can-heading machine, the combination, with a stationary non-circular chuck, of a pair of non-circular seaming-rollers, and means for revolving said seaming-rollers around said chuck in alternately continuous coöperative relation thereto.

18. In a can-heading machine, the combination, with a stationary non-circular chuck, of a pair of complementally non-circular seaming-rollers, and means for revolving said seaming-rollers around said chuck in alternately continuous coöperative relation thereto, the operatively effective orbit of revolution being fixed.

19. In a can-heading machine, the combination, with a stationary non-circular chuck, of a pair of complementally non-circular seaming-rollers, said chuck and seaming-rollers being of equal peripheral length, and means for revolving said seaming-rollers around said chuck in alternately continuous coöperative relation thereto, the operatively effective orbit of revolution being invariably circular.

20. In a can-heading machine, the combination, with a stationary non-circular chuck, of a seaming-roller, means for revolving said roller around said chuck, and means for intergearing said chuck and roller to insure pure rolling coöperation.

21. In a can-heading machine, the combination, with a stationary non-circular chuck, of a seaming roller, means for revolving said roller around said chuck, means for intergearing said chuck and roller to insure pure rolling coöperation, and means for moving said roller into and out of coöperative relation to said chuck without interference with their intergeared relation.

22. In a can-heading machine, the combination, with a stationary non-circular chuck, of a seaming-roller, means for revolving said roller around said chuck, means for permanently intergearing said chuck and roller to insure pure rolling coöperation, and means for moving said roller into and out of coöperative relation to said chuck.

23. In a can-heading machine, the combination, with a stationary non-circular chuck, of a complementally non-circular seaming-roller, means for revolving said roller around said chuck in a fixed orbit and in continuous coöperative relation thereto, and means for intergearing said chuck and roller to insure pure rolling coöperation.

24. In a can-heading machine, the combination, with a stationary non-circular chuck, of a complementally non-circular seaming-roller of the same peripheral length, means for revolving said roller around said chuck in a circular orbit and in continuous coöperative relation thereto, and means for intergearing said chuck and roller to insure pure rolling coöperation.

25. In a can-heading machine, the combination, with a stationary non-circular chuck, of a pair of seaming-rollers, means for revolving said rollers around said chuck in permanently intergeared relation, and means for moving said rollers alternately into and out of coöperatively effective relation to said chuck.

26. In a can-heading machine, the combination, with a stationary circular chuck, of a pair of seaming-rollers, means for revolving said rollers around said chuck in permanently intergeared relation, and means for moving said rollers alternately into and out of coöperatively effective relation to said chuck, the orbit of revolution being fixed during such coöperatively effective relation.

27. In a can-heading machine, the combination, with a stationary non-circular chuck, of a pair of complementally non-circular seaming-rollers, means for revolving said rollers around said chuck in permanently intergeared relation, and means for moving said rollers alternately into and out of coöperatively effective relation to said chuck, the orbit of revolution being circular during such coöperatively effective relation.

28. In a can-heading machine, the combination, with a stationary chuck, of a seaming-roller, means for revolving said roller around said chuck, and means for moving said roller into and out of continuously uniform coöperative relation to said chuck, said chuck and roller when in operation being both permanently and temporarily intergeared.

29. In a can-heading machine, the combination, with a stationary non-circular chuck, of a seaming-roller, means for revolving said roller around said chuck, and means for moving said roller into and out of continuously uniform coöperative relation to said chuck, said chuck and roller when in operation being both permanently and temporarily intergeared.

30. In a can-heading machine, the combination, with a stationary non-circular chuck, of a complementally non-circular seaming-roller, means for revolving said roller around said chuck, and means for moving said roller into and out of continuously uniform coöperative relation to said chuck, said chuck and roller when in operation being both permanently and temporarily intergeared.

31. In a can-heading machine, the combination, with a stationary chuck, of a pair of seaming-rollers, means for revolving said rollers around said chuck, and means for moving said rollers alternately into and out of continuously uniform coöperative relation to said chuck, said chuck and rollers when in operation being both permanently and temporarily intergeared.

32. In a can-heading machine, the combination, with a stationary chuck, of a seaming roller, means for continuously revolving said roller around said chuck in intermittently effective coöperative relation thereto, said chuck and roller being permanently intergeared, and auxiliary interposed gears in intermeshed relation during effective coöperation only.

33. In a can-heading machine, the combination, with a non-circular stationary chuck, of a complementally non-circular seaming-roller, means for continuously revolving said roller around said chuck in intermittently effective coöperative relation thereto, said chuck and roller being permanently intergeared, and auxiliary interposed gears in intermeshed relation during effective coöperation only.

34. In a can-heading machine, the combination, with a stationary chuck of a pair of seaming-rollers, means for revolving said rollers around said chuck in alternately continuous coöperative relation thereto, said chuck and rollers being permanently intergeared, and auxiliary interposed gears in intermeshed relation during effective coöperation of each roller only.

35. In a can-heading machine, the combination, with a stationary non-circular chuck of a pair of complemental-non-circular seaming-rollers, means for revolving said rollers around said chuck in alternately continuous coöperative relation thereto, said chuck and rollers being permanently intergeared, and auxiliary interposed gears in intermeshed relation during effective coöperation of each roller only.

In testimony of the foregoing, I have hereunto set my hand in the presence of two witnesses.

JULIUS BRENZINGER.

Witnesses:
T. E. WEEMS,
M. F. DICKEL.